( 12 ) United States Patent
Zhang et al.

(10) Patent No.: US 11,357,041 B2
(45) Date of Patent: Jun. 7, 2022

(54) SIMULTANEOUS MESSAGE TRANSMISSIONS IN RACH WITH MULTIPLE TRP

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/104,494

(22) Filed: Nov. 25, 2020

(65) Prior Publication Data

US 2021/0160923 A1 May 27, 2021

Related U.S. Application Data

(60) Provisional application No. 62/941,634, filed on Nov. 27, 2019.

(51) Int. Cl.
*H04W 72/04* (2009.01)
*H04W 74/00* (2009.01)
(Continued)

(52) U.S. Cl.
CPC ......... *H04W 74/008* (2013.01); *H04L 1/1819* (2013.01); *H04L 5/0055* (2013.01);
(Continued)

(58) Field of Classification Search
CPC ........... H04W 74/008; H04W 74/0833; H04W 74/006; H04W 24/10; H04W 56/001;
(Continued)

(56) References Cited

U.S. PATENT DOCUMENTS

2018/0110074 A1\* 4/2018 Akkarakaran .... H04W 72/0413
2018/0176847 A1\* 6/2018 Fasil Abdul .......... H04W 16/10
(Continued)

FOREIGN PATENT DOCUMENTS

WO 2016117985 A1 7/2016

OTHER PUBLICATIONS

International Search Report and Written Opinion—PCT/US2020/062457—ISA/EPO—dated Feb. 5, 2021 (200951WO).
(Continued)

*Primary Examiner* — Hassan Kizou
*Assistant Examiner* — Mahbubul Bar Chowdhury
(74) *Attorney, Agent, or Firm* — Arent Fox, LLP

(57) ABSTRACT

In an aspect, the present disclosure includes a method, apparatus, and computer readable medium for wireless communications at a UE, comprising receiving a RACH configuration from a network entity of a primary cell, the RACH configuration identifies at least two sets of RSs each corresponding to one of at least two different TRPs of a secondary cell; measuring one or more transmissions on each of the at least two sets of RSs for the at least two different TRPs; selecting at least a pair of RSs from the at least two different TRPs for a RACH procedure based on measuring the one or more transmissions; and transmitting a MSG1 of the RACH procedure with at least the pair of RSs on at least two allocated RACH occasions simultaneously to each TRP of the at least two different TRPs using at least one of FDM and SDM.

30 Claims, 13 Drawing Sheets

(51) Int. Cl.
  *H04W 24/10* (2009.01)
  *H04W 74/08* (2009.01)
  *H04W 76/27* (2018.01)
  *H04L 5/00* (2006.01)
  *H04W 56/00* (2009.01)
  *H04L 1/18* (2006.01)

(52) U.S. Cl.
  CPC ......... *H04W 24/10* (2013.01); *H04W 56/001* (2013.01); *H04W 74/0833* (2013.01); *H04W 76/27* (2018.02)

(58) Field of Classification Search
  CPC .... H04W 76/27; H04L 1/1819; H04L 5/0055; H04L 5/0053; H04L 5/0048; H04B 7/024
  See application file for complete search history.

(56) References Cited

U.S. PATENT DOCUMENTS

2018/0343595 A1*  11/2018  da Silva ................. H04L 5/005
2019/0045467 A1*  2/2019   Wu ..................... H04J 11/0076
2019/0045566 A1   2/2019   Wu
2019/0053271 A1*  2/2019   Islam ................ H04W 74/0866
2019/0104552 A1*  4/2019   Hui ........................ H04W 48/10
2019/0150190 A1*  5/2019   Kim .................. H04W 56/0015
                                                                 370/329
2019/0159261 A1*  5/2019   Jung ................. H04W 74/0891

OTHER PUBLICATIONS

Samsung: "RACH Aspects for CA and DC", 3GPP Draft, 3GPP TSG RAN WG1 NR #90, R1-1714491, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051317267, 4 Pages, Retrieved from the Internet: URL: http://www.3gpp.org/ftp/Meetings_3GPP_SYNC/RAN1/Docs/. [retrieved on Aug. 20, 2017] section 2.

* cited by examiner

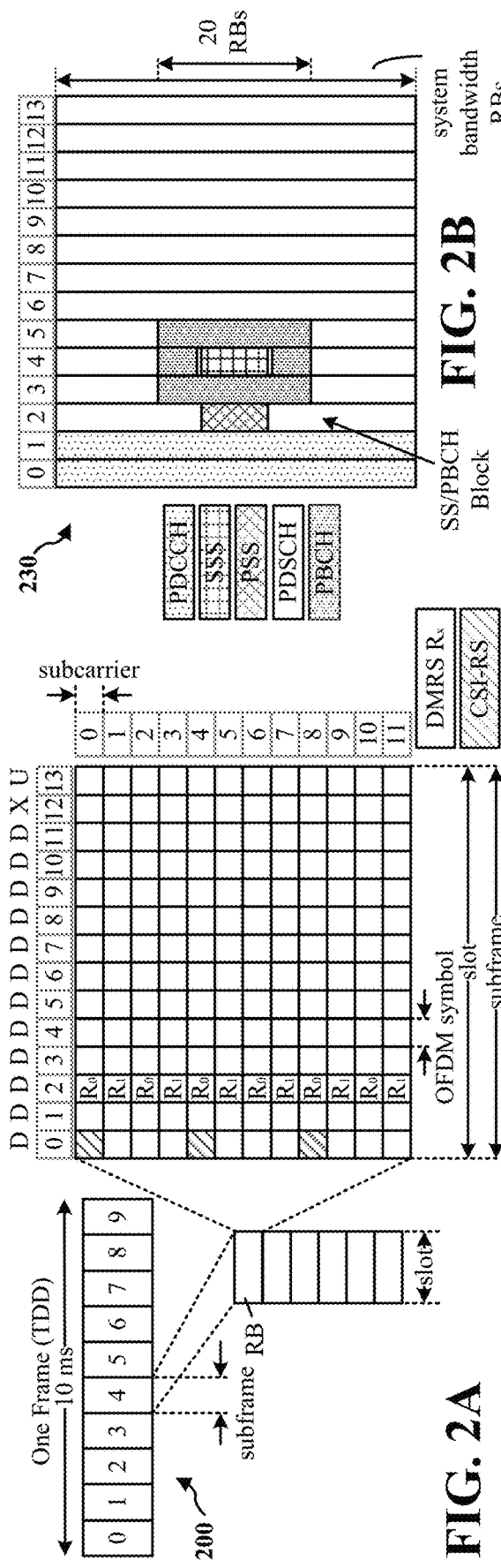
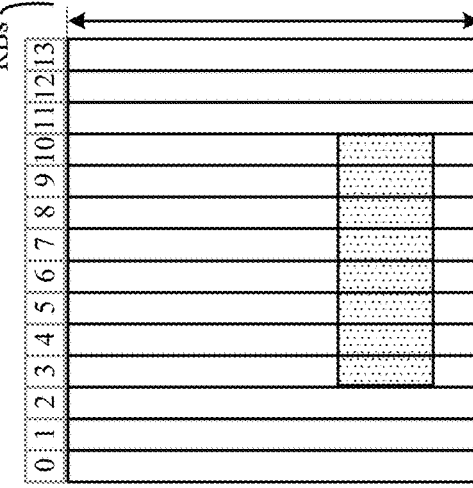
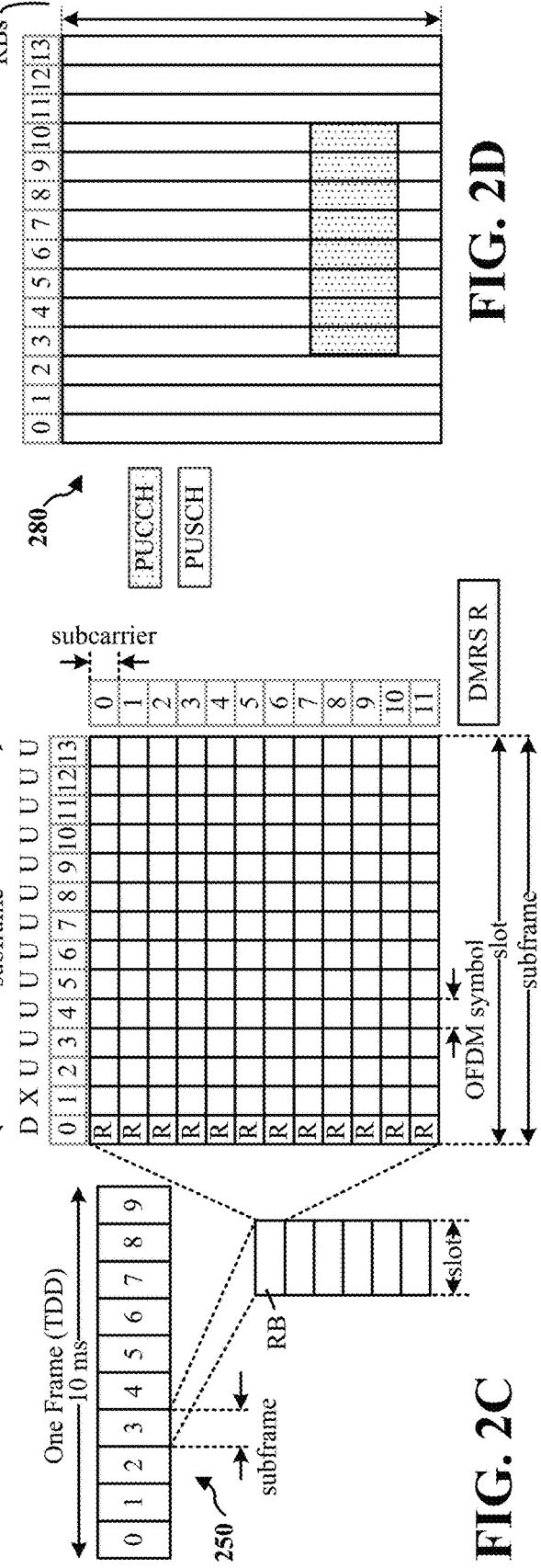
FIG. 2A  FIG. 2B  FIG. 2C  FIG. 2D

1000

1002

Transmit a random access channel (RACH) configuration to a user equipment (UE), the measurement configuration identifies at least two sets of reference signals (RSs) each corresponding to one of at least two different transmission/reception points (TRPs) and at least two allocated RACH occasions

1004

Receive a first message (MSG1) of the RACH procedure from each of the at least different TRPs with at least a pair of RSs of the at least two sets of RSs on one of the at least two allocated RACH occasions simultaneously using at least one of frequency division multiplexing (FDM) and spatial division multiplexing (SDM)

SIMULTANEOUS MESSAGE TRANSMISSIONS IN RACH WITH MULTIPLE TRP

CROSS-REFERENCE TO RELATED APPLICATION(S)

The present application claims benefit of U.S. Provisional Application No. 62/941,634 entitled "SIMULTANEOUS MESSAGE TRANSMISSIONS IN RACH WITH MULTIPLE TRP" filed Nov. 27, 2019, which is assigned to the assignee hereof and hereby expressly incorporated by reference herein.

BACKGROUND

Technical Field

The present disclosure relates generally to communication systems, and more particularly, to simultaneous message (MSG) transmissions in random access channel (RACH) procedure with multiple transmission/reception points (TRPs) in fifth generation new radio (5G NR).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Due to the increasing demand for wireless communications, there is a desire to improve the efficiency of wireless communication network techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE), including receiving a random access channel (RACH) configuration from a network entity of a primary cell, the RACH configuration identifies at least two sets of reference signals (RSs) each corresponding to one of at least two different transmission/reception points (TRPs) of a secondary cell; measuring one or more transmissions on each of the at least two sets of RSs for the at least two different TRPs; selecting at least a pair of RSs from the at least two different TRPs for a RACH procedure based on measuring the one or more transmissions; and transmitting a first message (MSG1) of the RACH procedure with at least the pair of RSs on at least two allocated RACH occasions simultaneously to each TRP of the at least two different TRPs using at least one of frequency division multiplexing (FDM) and spatial division multiplexing (SDM).

Another example implementation includes an apparatus for wireless communication at a UE, including a processor and a memory in communication with the processor. The memory storing instructions which, when executed by the processor, cause the processor to receive a RACH configuration from a network entity of a primary cell, the RACH configuration identifies at least two sets of RSs each corresponding to one of at least two different TRPs of a secondary cell; measure one or more transmissions on each of the at least two sets of RSs for the at least two different TRPs; select at least a pair of RSs from the at least two different TRPs for a RACH procedure based on measuring the one or more transmissions; and transmit a MSG1 of the RACH procedure with at least the pair of RSs on at least two allocated RACH occasions simultaneously to each TRP of the at least two different TRPs using at least one of FDM and SDM.

Another example implementation includes an apparatus for wireless communication at a UE, including means for receiving a RACH configuration from a network entity of a primary cell, the RACH configuration identifies at least two sets of RSs each corresponding to one of at least two different TRPs of a secondary cell; means for measuring one or more transmissions on each of the at least two sets of RSs for the at least two different TRPs; means for selecting at least a pair of RSs from the at least two different TRPs for a RACH procedure based on measuring the one or more transmissions; and means for transmitting a MSG1 of the RACH procedure with at least the pair of RSs on at least two allocated RACH occasions simultaneously to each TRP of the at least two different TRPs using at least one of FDM and SDM.

Another example implementation includes a non-statutory computer-readable medium storing instructions for wireless communication at UE, executable by a processor to receive a RACH configuration from a network entity of a primary cell, the RACH configuration identifies at least two sets of RSs each corresponding to one of at least two different TRPs of a secondary cell; measure one or more transmissions on each of the at least two sets of RSs for the at least two different TRPs; select at least a pair of RSs from the at least two different TRPs for a RACH procedure based on measuring the one or more transmissions; and transmit a MSG1 of the RACH procedure with at least the pair of RSs on at least two allocated RACH occasions simultaneously to each TRP of the at least two different TRPs using at least one of FDM and SDM.

Another example implementation includes a method of wireless communication at a network entity, including transmitting a RACH configuration to a UE, the measurement configuration identifies at least two sets of reference signals (RSs) each corresponding to one of at least two different TRPs and at least two allocated RACH occasions; and receiving a MSG1 of the RACH procedure from each of the at least two different TRPs with at least a pair of RSs of the at least two sets of RSs on one of the at least two allocated RACH occasions simultaneously using at least one of FDM and SDM.

Another example implementation includes an apparatus for wireless communication at a network entity, including a processor and a memory in communication with the processor. The memory storing instructions which, when executed by the processor, cause the processor to transmit a RACH configuration to a UE, the measurement configuration identifies at least two sets of RSs each corresponding to one of at least two different TRPs and at least two allocated RACH occasions; and receive a MSG1 of the RACH procedure from each of the at least two different TRPs with at least a pair of RSs of the at least two sets of RSs on one of the at least two allocated RACH occasions simultaneously using at least one of FDM and SDM.

Another example implementation includes an apparatus for wireless communication at a network entity, including means for transmitting a RACH configuration to a UE, the measurement configuration identifies at least two sets of RSs each corresponding to one of at least two different TRPs and at least two allocated RACH occasions; and means for receiving a MSG1 of the RACH procedure from each of the at least two different TRPs with at least a pair of RSs of the at least two sets of RSs on one of the at least two allocated RACH occasions simultaneously using at least one of FDM and SDM.

Another example implementation includes a non-statutory computer-readable medium storing instructions for wireless communication, executable by a processor to transmit a RACH configuration to a UE, the measurement configuration identifies at least two sets of RSs each corresponding to one of at least two different TRPs and at least two allocated RACH occasions; and receive a MSG1 of the RACH procedure from each of the at least two different TRPs with at least a pair of RSs of the at least two sets of RSs on one of the at least two allocated RACH occasions simultaneously using at least one of FDM and SDM.

Another example implementation includes a method of wireless communication, including receiving, by a first TRP from a UE, a MSG1 of a RACH procedure, wherein the MSG1 is simultaneously transmitted by the UE to a second TRP; and transmitting, by the first TRP to the UE, a MSG2 of the RACH procedure in response to receiving the MSG1, wherein the MSG2 is simultaneously transmitted by the second TRP.

Another example implementation includes an apparatus for wireless communication, including a processor and a memory in communication with the processor. The memory storing instructions which, when executed by the processor, cause the processor to receive, by a first TRP from a UE, a MSG1 of a RACH procedure, wherein the MSG1 is simultaneously transmitted by the UE to a second TRP; and transmit, by the first TRP to the UE, a MSG2 of the RACH procedure in response to receiving the MSG1, wherein the MSG2 is simultaneously transmitted by the second TRP.

Another example implementation includes an apparatus for wireless communication, including means for receiving, by a first TRP from a UE, a MSG1 of a RACH procedure, wherein the MSG1 is simultaneously transmitted by the UE to a second TRP; and means for transmitting, by the first TRP to the UE, a MSG2 of the RACH procedure in response to receiving the MSG1, wherein the MSG2 is simultaneously transmitted by the second TRP.

Another example implementation includes a non-statutory computer-readable medium storing instructions for wireless communication, executable by a processor to receive, by a first TRP from a UE, a MSG1 of a RACH procedure, wherein the MSG1 is simultaneously transmitted by the UE to a second TRP; and transmit, by the first TRP to the UE, a MSG2 of the RACH procedure in response to receiving the MSG1, wherein the MSG2 is simultaneously transmitted by the second TRP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, in accordance with various aspects of the present disclosure.

FIG. 10 is a flowchart of a method of wireless communication of an example of initiating a RACH procedure by a network entity of a cell, in accordance with various aspects of the present disclosure.

DETAILED DESCRIPTION

Figure 1:
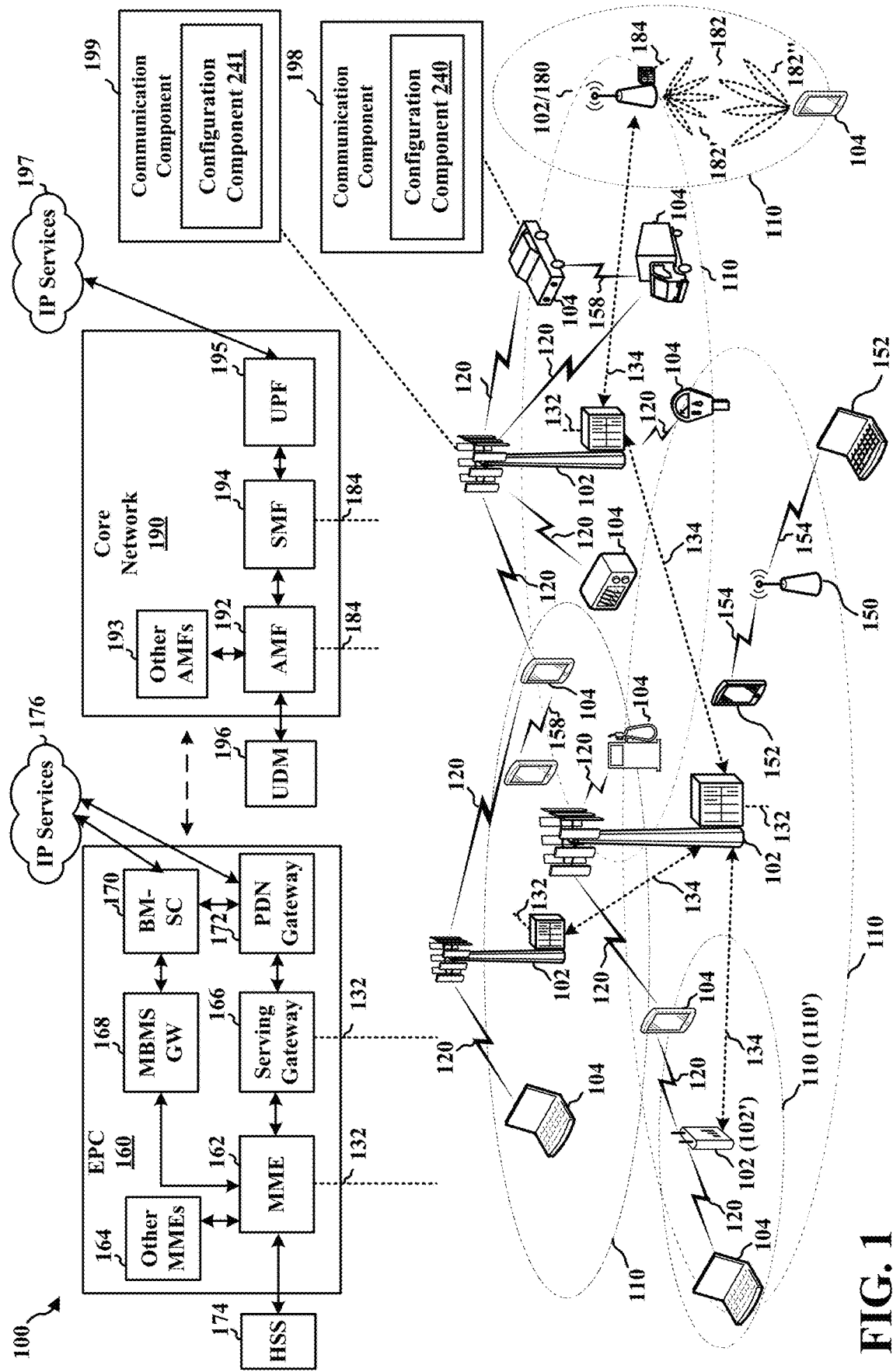
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 configured for simultaneous message (MSG) transmissions in random access channel (RACH) procedure with multiple transmission/reception points (TRPs). The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate a communication component 198 and/or a configuration component 240 to receive from a network entity of a cell, a RACH configuration that identifies at least two sets of reference signals (RSs) each corresponding to one of at least two different TRPs of a secondary cell; measure one or more transmissions on each of the at least two sets of RSs for the at least two different TRPs; select a pair of RSs from two different TRPs for a RACH procedure based on measuring the one or more transmissions; and transmit a first message (MSG1) of the RACH procedure with the selected pair of RSs on two allocated RACH occasions simultaneously to each TRP of the pair of TRPs using at least one of a frequency division multiplexing (FDM) or spatial division multiplexing (SDM).

Correspondingly, in certain aspects, the network entity 102 (e.g., base station) may be configured to operate a communication component 199 and/or a configuration component 241 to transmit, to a UE, a measurement configuration that identifies at least two sets of RSs each corresponding to one of at least two different TRPs; and receive, from the UE, a beam report including one or more pairs of reference signals indices and corresponding TRP indices, wherein each of one or more pairs of beams corresponding to each of the one or more pairs of reference signals are simultaneously communicable. In another aspect, the network entity 102 (e.g., base station) may be configured to operate a communication component 199 and/or a configuration component 241 to receive, from a UE, a MSG1 of a RACH procedure, wherein the MSG1 is simultaneously transmitted by the UE to a second TRP; and transmit, to the UE, a MSG2 of the RACH procedure in response to receiving the MSG1, wherein the MSG2 is simultaneously transmitted by the second TRP.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104, and/or the secondary UEs (or sidelink UEs) 110 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
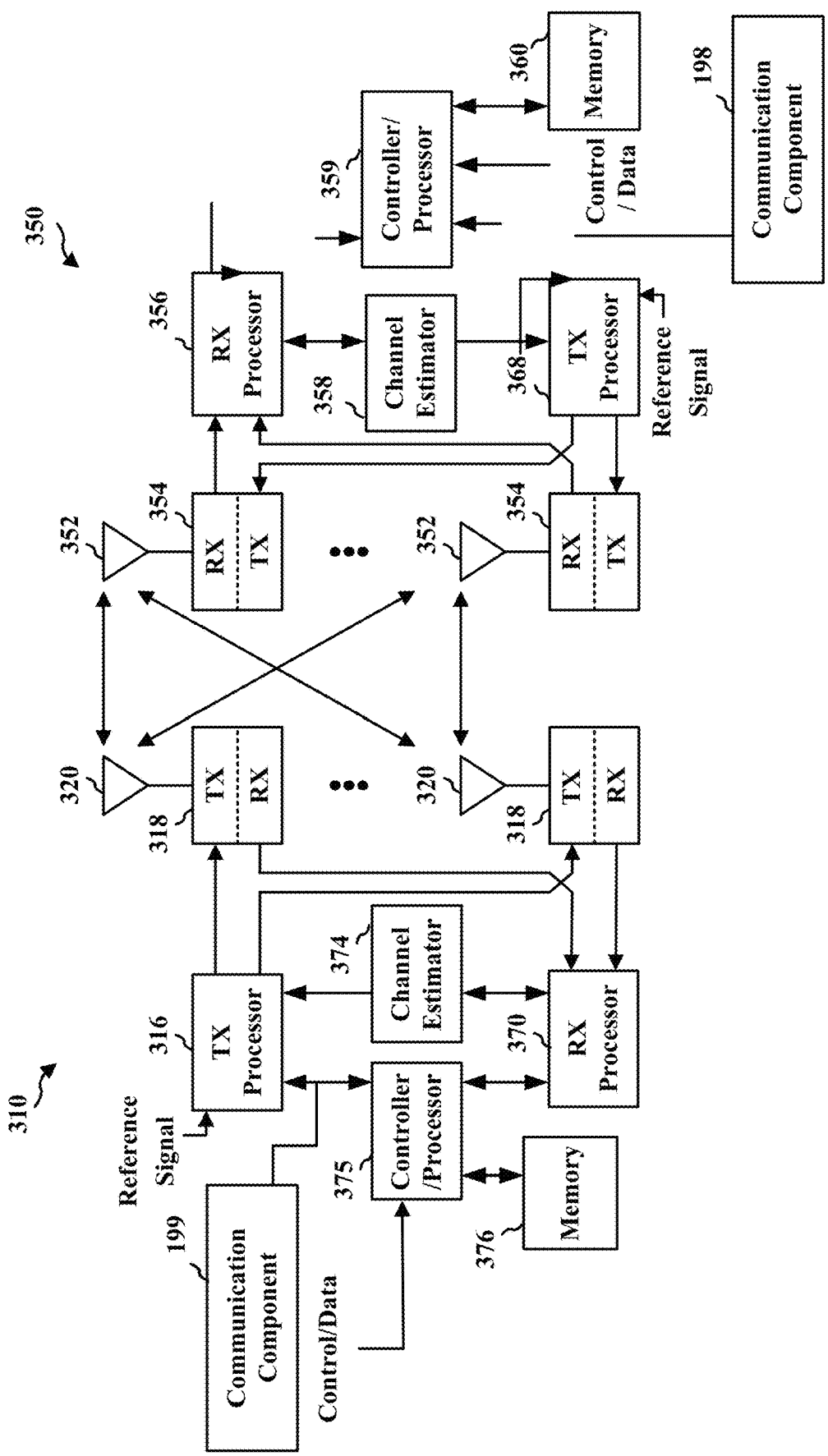
FIG. 3 is a diagram illustrating an example of a base station and user equipment (UE) in an access network, in accordance with various aspects of the present disclosure.

FIG. 3 is a block diagram of a base station 310 in communication with a UE 350 in an access network, where the base station 310 may be an example implementation of base station 102 and where UE 350 may be an example implementation of UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with communication component 198 of FIG. 1.

At least one of the TX processor 316, the RX processor 370, and the controller/processor 375 may be configured to perform aspects in connection with communication component 199 of FIG. 1.

Referring to FIGS. 4-13, the described features generally relate to simultaneous message (MSG) transmissions in random access channel (RACH) procedure with multiple transmission/reception points (TRPs) in fifth generation new radio unlicensed (5G NR-U). In an aspect, a primary cell configures a UE for layer 3 (L3) measurements on one or more secondary cells (e.g., primary secondary cells (PS-Cell). For example, the UE measures one or more synchronization signal blocks (SSBs) of the secondary cell in corresponding SSB-based measurement timing configuration (SMTC) parameters. The UE transmits an L3 beam report to a cell (e.g., primary cell (PCell) via an event trigger or periodic report. Based on the L3 report, the cell (e.g., PCell) initiates a secondary cell addition procedure. For example, the UE receives the secondary cell RACH configuration from the primary cell and identifies the best downlink reference signal beam. The UE may send a first message (MSG1) to the corresponding RACH occasion. Then, the second, third, and fourth message (e.g., MSG 2/3/4) are exchanged via the same reference signal beam to complete the access procedure.

The present disclosure relates generally to current issues of performing a RACH procedure for multiple TRPs. For example, in an aspect, the present disclosure includes a method, apparatus, and non-statutory computer readable medium for wireless communications at a UE, comprising receiving a RACH configuration from a network entity of a primary cell, the RACH configuration identifies at least two sets of reference signals (RSs) each corresponding to one of at least two different transmission/reception points (TRPs) of a secondary cell; measuring one or more transmissions on each of the at least two sets of RSs for the at least two different TRPs; selecting at least a pair of RSs from the at least two different TRPs for a RACH procedure based on measuring the one or more transmissions; and transmitting a MSG1 of the RACH procedure with at least the pair of RSs on at least two allocated RACH occasions simultaneously to each TRP of the at least two different TRPs using at least one of frequency division multiplexing (FDM) and spatial division multiplexing (SDM).

In another example, the present disclosure includes a method, apparatus, and non-statutory computer readable medium for wireless communications at a network entity, comprising transmitting a RACH configuration to a UE, the measurement configuration identifies at least two sets of RSs each corresponding to one of at least two different TRPs; and receiving a MSG1 of the RACH procedure from the UE with at least a pair of RSs on one of at least two allocated RACH occasions simultaneously with one of the at least two different TRPs using at least one of FDM and SDM.

In another example, present disclosure includes a method, apparatus, and non-statutory computer readable medium for wireless communications for receiving, by a first TRP from a UE, a MSG1 of a RACH procedure, wherein the MSG1 is simultaneously transmitted by the UE to a second TRP; and transmitting, by the first TRP to the UE, a MSG2 of the RACH procedure in response to receiving the MSG1, wherein the MSG2 is simultaneously transmitted by the second TRP.

Figure 4:
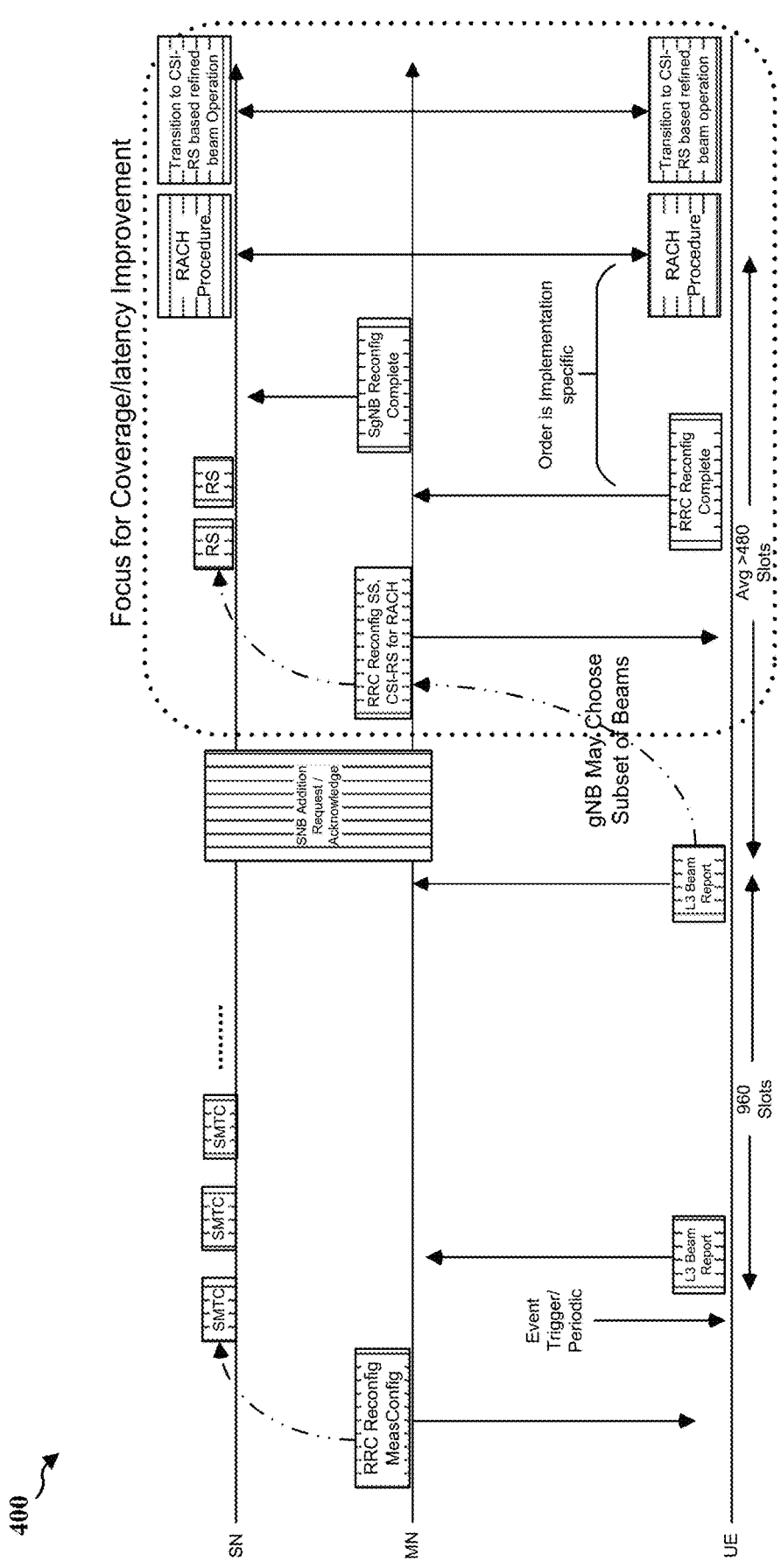
FIG. 4 is a diagram illustrating an example of establishing RACH procedure with a secondary cell, in accordance with various aspects of the present disclosure.

FIG. 4 is a diagram illustrating an example of establishing RACH procedure with a secondary cell. In an aspect, diagram 400 illustrates a primary cell (e.g., PCell) transmitting a radio resource control (RRC) reconfiguration measurement configuration to a UE for layer 3 (L3) measurements on a secondary cell (e.g., primary secondary cell (PSCell). For example, the UE measures one or more synchronization signal blocks (SSBs) of the secondary cell in corresponding SSB-based measurement timing configuration (SMTC) parameters. The UE transmits an L3 beam report to the PCell via an event trigger or periodic report. Based on the L3 report, the cell (e.g., PCell) initiates a secondary cell addition procedure. For example, the UE receives the secondary cell RACH configuration from the primary cell and identifies the best downlink reference signal beam. The UE may send a MSG1 to the corresponding RACH occasion. Then, the second, third, and fourth message (e.g., MSG 2/3/4) are exchanged via the same reference signal beam to complete the access procedure.

Figure 5:
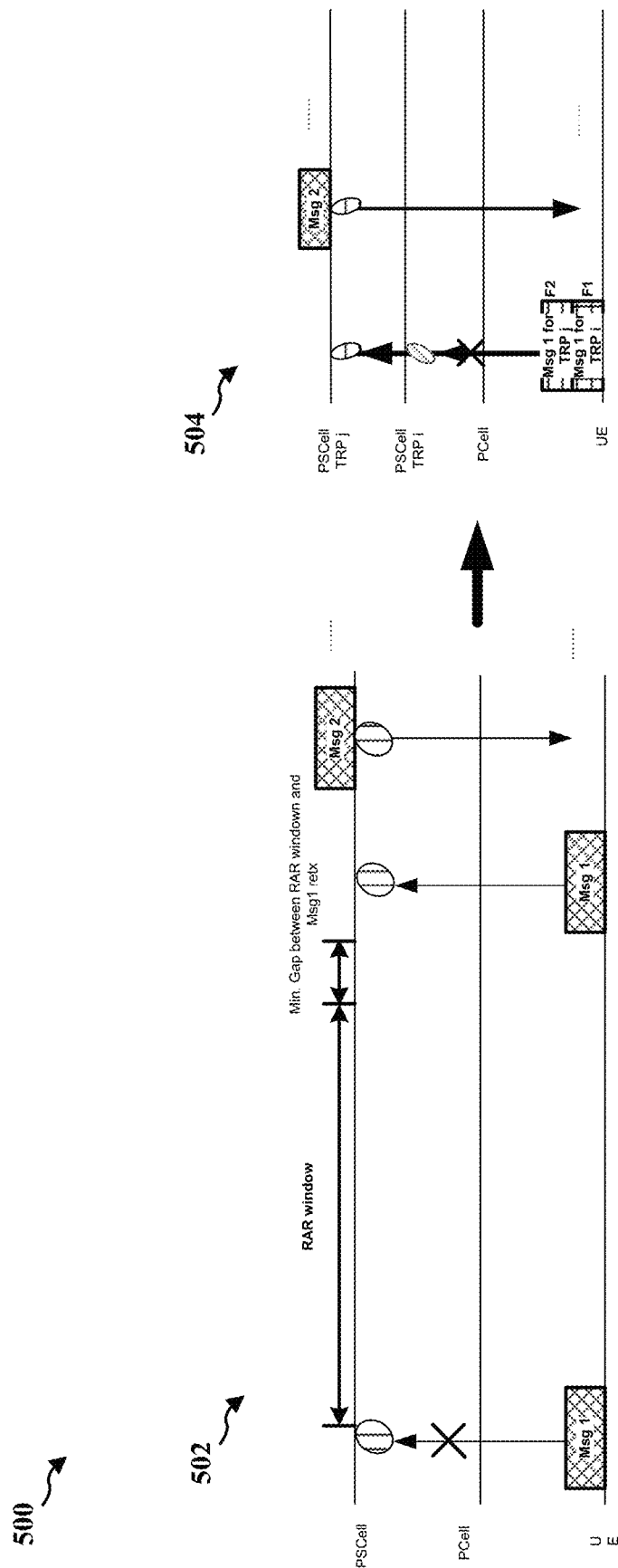
FIG. 5 is a diagram illustrating an example of message flow in a RACH procedure between a UE and a secondary cell as compared to a RACH procedure with the UE simultaneously exchanging messages with multiple transmit/receive points, in accordance with various aspects of the present disclosure.

FIG. 5 is a diagram illustrating an example of a first message flow in a first RACH procedure 502 between a UE and a secondary cell, which may experience delays, as compared to a second message flow in a second RACH procedure 504 as described here that utilizes simultaneous message exchange between multiple transmit/receive points and the UE, which may have improved reliability and improved latency relative to RACH procedure 502. In an aspect, diagram 500 illustrates second RACH procedure 504 including transmitting multiple MSG1 to multiple TRPs. For example, a UE can simultaneously transmit MSG1 to multiple TRPs of the secondary cell (e.g., PSCell). In contrast, as in the first RACH procedure 502, without simultaneous transmissions to multiple TRPs, if a MSG1 fails (see the "X"), then the UE may be required to wait until the RAR window expires to retransmit another preamble. Further, although not illustrated, in the second RACH procedure 504, the UE may simultaneously exchange MSG 2/3/4 with the multiple TRPs of the PSCell.

Figure 6:
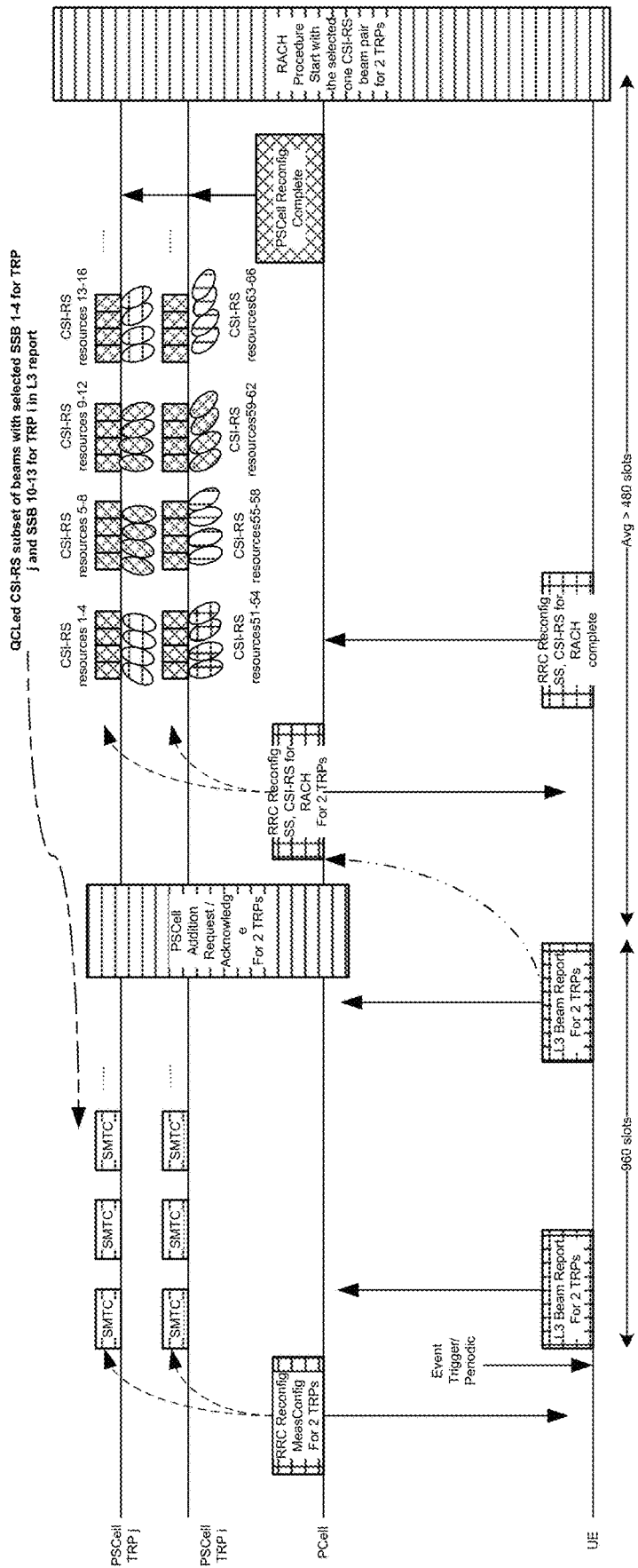
FIG. 6 is a diagram illustrating an example of a flow of CSI-RS based RACH measurement prior to initiating a RACH procedure where the UE simultaneously exchanges messages with multiple transmit/receive points, in accordance with various aspects of the present disclosure.

FIG. 6 is a diagram illustrating an example of a flow of CSI-RS based RACH measurement for use prior to initiating the RACH procedure including the UE simultaneously exchanging RACH messages with multiple TRPs. In an aspect, diagram 600 illustrates a procedure for non-stand alone mode CFRA for connection set up on a secondary cell in 5G NR. For example, the primary cell may transmit an RRC reconfiguration measurement configuration to a UE. Based on the RRC reconfiguration measurement configuration the primary cell may configure measurement parameters with TRP indices. The primary cell may inform the UE of the TRP index per measured reference signal in the RRC reconfiguration measurement configuration. In an example, the measurement parameters may be SMTC configuration parameters. As shown in diagram 600, the reference signals may correspond to CSI-RS.

In an aspect, using the L3 beam report, the UE may report one or more pairs of reference signal indices and corresponding TRP indices of which each pair of beams corresponding to each pair of reference signals are simultaneously transmittable and/or receivable. The primary cell may inform the secondary cells via a X2 message for two TRPs based on the reference signal pairs from the L3 beam report. The primary cell may initiate a secondary addition procedure for the two TRPs.

In an aspect, the primary cell may transmit the RRC RACH configuration to the UE with a set of RS pairs and TRP indices per pair. For example, the two reference signals from each of the reported reference signal pairs may be transmitted simultaneously, e.g., using FDM and/or SDM, for the UE to measure for the RACH procedure. Based on the measurement, the UE may select two RACH resources corresponding to the best reference signal pair for simultaneous preamble transmissions, e.g., using FDM/SDM.

Figure 7:
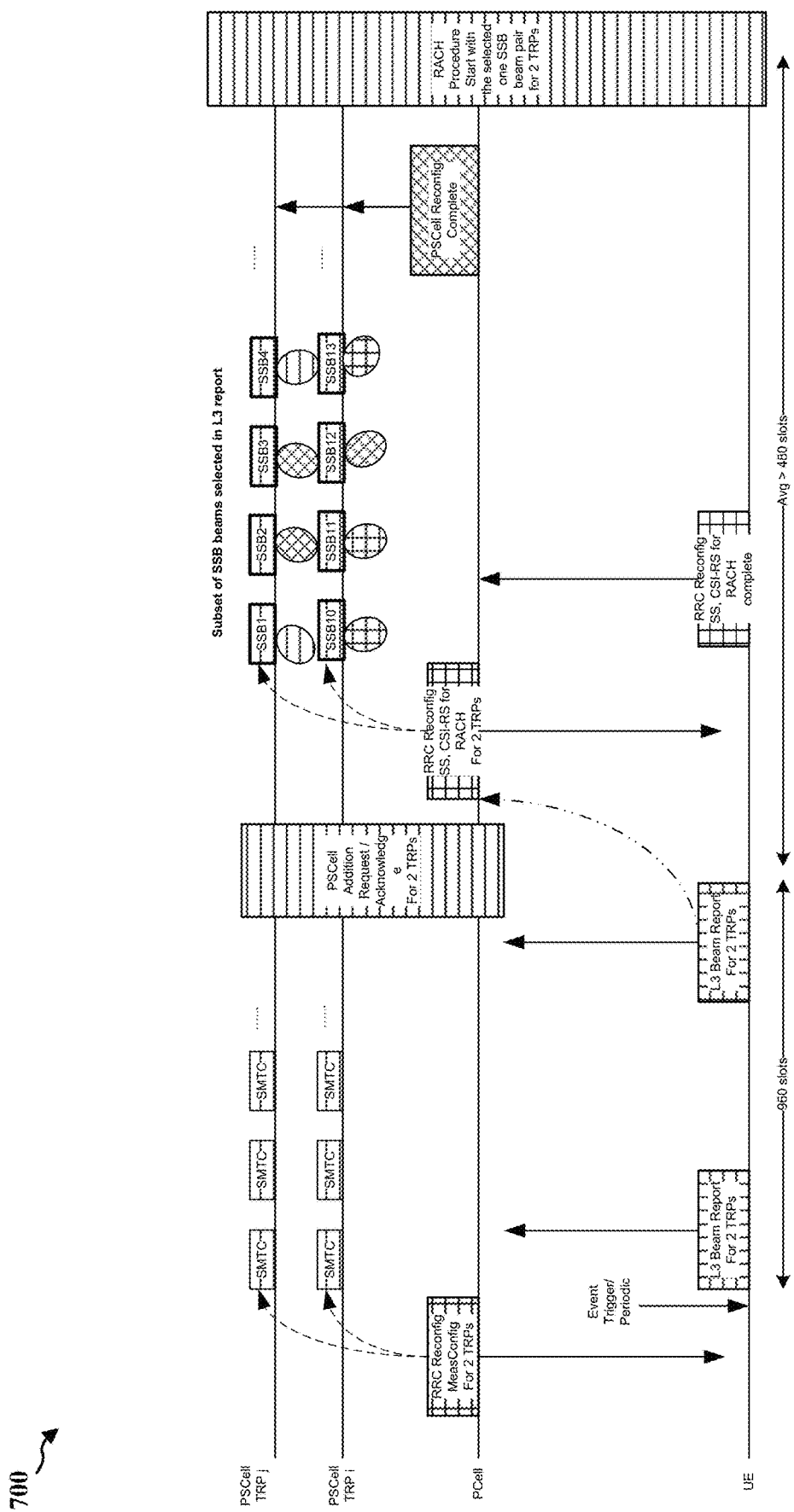
FIG. 7 is a diagram illustrating an example of a flow of SSB based RACH measurement prior to initiating a RACH procedure where the UE simultaneously exchanges messages with multiple transmit/receive points, in accordance with various aspects of the present disclosure.

FIG. 7 is a diagram illustrating an example of a flow of SSB based RACH measurement for use prior to initiating the RACH procedure including the UE simultaneously exchanging RACH messages with multiple TRPs. In an aspect, diagram 700 illustrates the procedure for non-stand alone mode CFRA for connection set up on a secondary cell in 5G NR similar to diagram 600, as described herein, but where the reference signals may correspond to SSBs.

Figure 8:
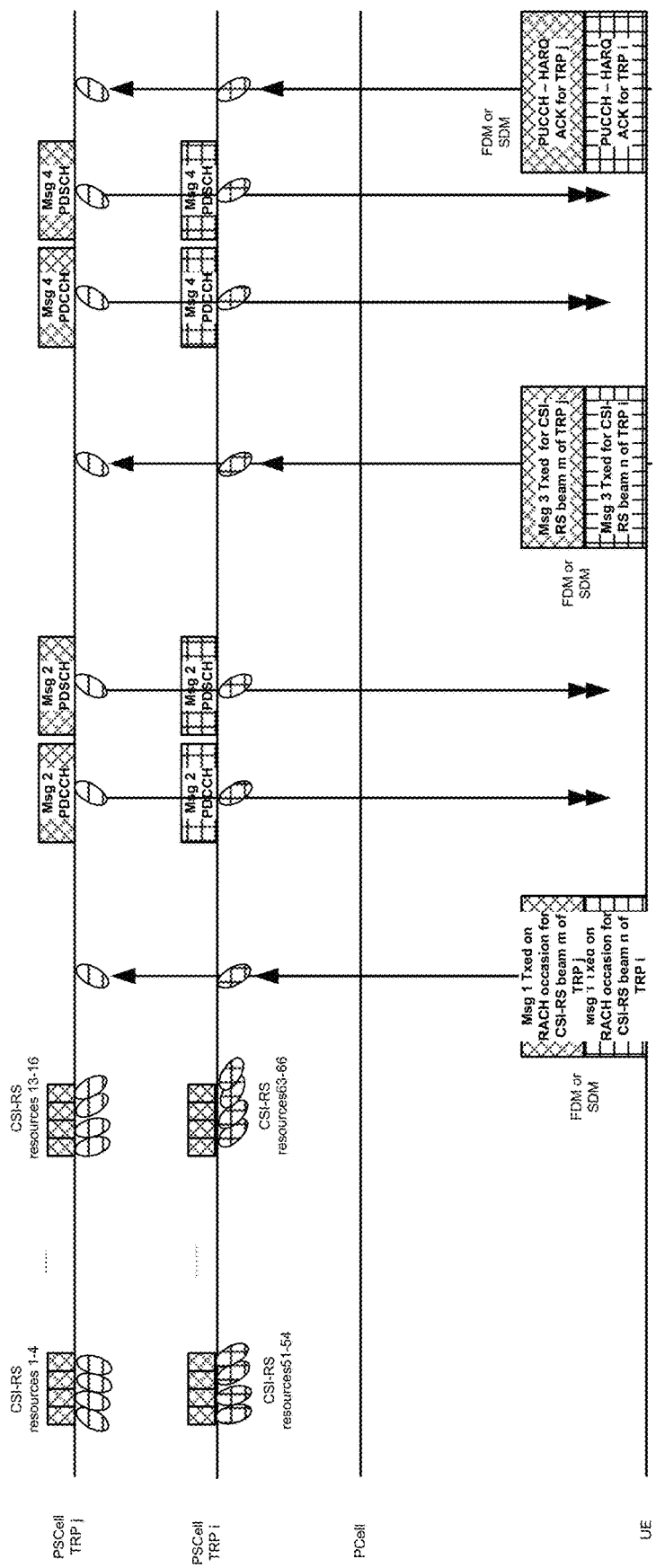
FIG. 8 is a diagram illustrating an example of a flow of simultaneous message transmission in a RACH procedure between the UE and multiple transmit/receive points, in accordance with various aspects of the present disclosure.

FIG. 8 is a diagram illustrating an example of a flow of simultaneous message transmission in a RACH procedure. In an aspect, diagram 800 illustrates the simultaneous communications, e.g., using FDS or SDM, between multiple TRPs and the UE. For example, the UE may send two preamble in MSG1 with the two selected reference signals simultaneously on the two allocated RACH occasions (e.g., using FDM/SDM). The MSG2 PDCCH and PDSCH may be transmitted by the two TRPs simultaneously (e.g., FDM/SDM), via the same or different PDCCH beams. In an example, the MSG2 from the two TRPs may be triggered by simultaneous reception of the preambles of different TRPs of the secondary cell. With the granted uplink resources in MSG2, the UE may send MSG3 to the two TRPs simultaneously. The granted uplink resources are two TRPs and may be at least one of SDM and/or FDM. The two TRPs may then transmit MSG4 PDCCH and PDSCH simultaneously to the UE (e.g., using SDM/FDM). In an example, the UE may send the HARQ acknowledgement using PUCCH simultaneously to the two TRPs to complete the secondary cell access procedure (e.g., using SDM/FDM).

Figure 9:
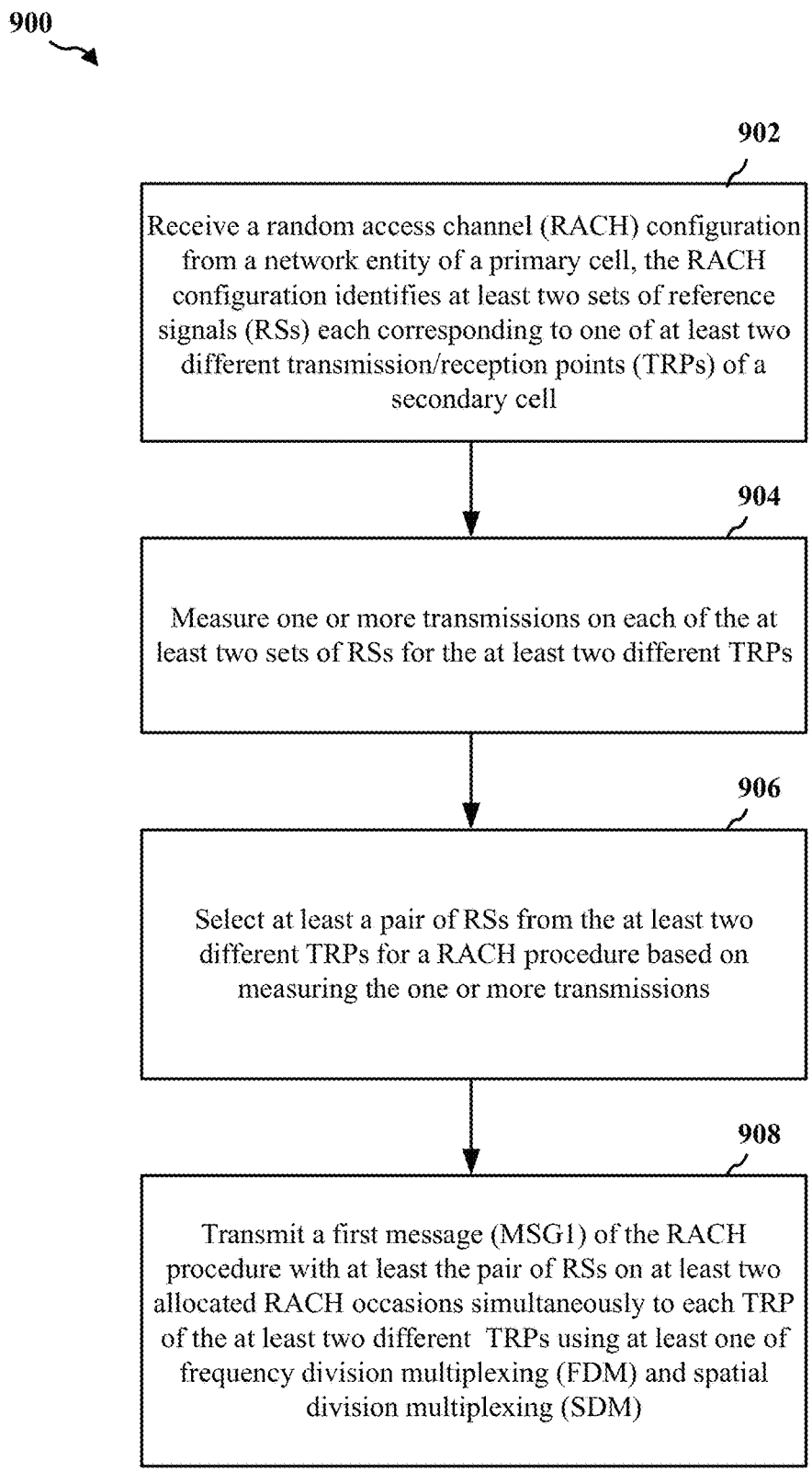
FIG. 9 is a flowchart of a method of wireless communication of an example of performing simultaneous message transmissions during a RACH procedure by a UE, in accordance with various aspects of the present disclosure.

FIG. 9 is a flowchart 900 of a method of wireless communication. The method may be performed by a UE (e.g., the UE 104; the apparatus 350; the controller/processor 359, which may include the memory 360, processor(s) 1212, which may include the memory 1216, modem 1240 and which may be the entire UE 104 or a component of the UE 104, such as the TX processor 368, the RX processor 356, and/or the transceiver 1202) in combination with the communication component 198/configuration component 240.

At 902, method 900 includes receiving a RACH configuration from a network entity of a primary cell, the RACH configuration identifies at least two sets of RSs each corresponding to one of at least two different TRPs of a secondary cell. In an aspect, the UE 104 and/or the communication component 198/configuration component 240 may be configured to receive a RACH configuration from a network entity of a primary cell, the RACH configuration identifies at least two sets of RSs each corresponding to one of at least two different TRPs of a secondary cell. As such, the UE 104 and/or the communication component 198/configuration component 240, e.g., in conjunction with controller/processor 359, which may include the memory 360, processor(s) 1212, which may include the memory 1216, modem 1240, TX processor 368, and transceiver 1202 may define a means for receiving a RACH configuration from a network entity of a primary cell, the RACH configuration identifies at least two sets of RSs each corresponding to one of at least two different TRPs of a secondary cell.

At 904, method 900 includes measuring one or more transmissions on each of the at least two sets of RSs for the at least two different TRPs. In an aspect, the UE 104 and/or the communication component 198/configuration component 240 may be configured to measure one or more transmissions on each of the at least two sets of RSs for the at least two different TRPs. As such, the UE 104 and/or the communication component 198/configuration component 240, e.g., in conjunction with controller/processor 359, which may include the memory 360, processor(s) 1212, which may include the memory 1216, modem 1240, RX processor 356, and transceiver 1202 may define a means for measuring one or more transmissions on each of the at least two sets of RSs for the at least two different TRPs.

At 906, method 900 includes selecting a pair of RSs from the at least two different TRPs for a RACH procedure based on measuring the one or more transmissions. In an aspect, the UE 104 and/or the communication component 198/configuration component 240 may be configured to select a pair of RSs from the at least two different TRPs for a RACH procedure based on measuring the one or more transmissions. As such, the UE 104 and/or the communication component 198/configuration component 240, e.g., in conjunction with controller/processor 359, which may include the memory 360, processor(s) 1212, which may include the memory 1216, modem 1240, RX processor 356, and transceiver 1202 may define a means for selecting a pair of RSs from the at least two different TRPs for a RACH procedure based on measuring the one or more transmissions.

At 908, method 900 includes transmitting a MSG1 of the RACH procedure with at least the pair of RSs on at least two allocated RACH occasions simultaneously to each TRP of the at least two different TRPs using at least one of FDM and SDM. In an aspect, the UE 104 and/or the communication component 198/configuration component 240 may be configured to transmit a MSG1 of the RACH procedure with at least the pair of RSs on at least two allocated RACH occasions simultaneously to each TRP of the at least two different TRPs using at least one of FDM and SDM. As such, the UE 104 and/or the communication component 198/configuration component 240, e.g., in conjunction with controller/processor 359, which may include the memory 360, processor(s) 1212, which may include the memory 1216, modem 1240, RX processor 356, and transceiver 1202 may define a means for transmitting a MSG1 of the RACH procedure with at least the pair of RSs on at least two allocated RACH occasions simultaneously to each TRP of the at least two different TRPs using at least one of FDM and SDM.

In some implementations of method 900, the UE 104 and/or the communication component 198/configuration component 240 may be configured for receiving a second message (MSG2) of a physical downlink control channel (PDCCH) and a Physical Downlink Shared Channel (PDSCH) of the RACH procedure simultaneously from each TRP of the at least two different TRPs using at least one of the FDM and the SDM.

In some implementations of method 900, the MSG2 is received via a same or different PDCCH beam from the each TRP of the at least two different of TRPs.

In some implementations of method 900, the UE 104 and/or the communication component 198/configuration component 240 may be configured for transmitting a third message (MSG3) of the RACH procedure simultaneously to each TRP of the at least two different TRPs using at least one of the FDM and the SDM.

In some implementations of method 900, the UE 104 and/or the communication component 198/configuration component 240 may be configured for receiving a fourth message (MSG4) of the RACH procedure simultaneously from each TRP of the at least two different TRPs in response to transmitting the MSG3 using at least one of the FDM and the SDM.

In some implementations of method 900, the MSG4 corresponds to a PDCCH part and a physical downlink shared channel (PDSCH) part.

In some implementations of method 900, the UE 104 and/or the communication component 198/configuration component 240 may be configured for transmitting a hybrid automatic request (HARQ) acknowledgement simultaneously to each of TRP of the at least two different TRPs using at least one of the FDM and the SDM.

In some implementations of method 900, the HARQ acknowledgement is transmitted using a physical uplink control channel (PUCCH).

In some implementations of method 900, the UE 104 and/or the communication component 198/configuration component 240 may be configured for receiving a radio resource control (RRC) reconfiguration measurement configuration from the network entity of the primary cell prior to performing the RACH procedure.

In some implementations of method 900, the RRC reconfiguration measurement configuration configures one or more measurement parameters with TRP indices for each of the at least two different TRPs.

In some implementations of method 900, the one or more measurement parameters corresponds to one or more synchronization signal block (SSB)-based measurement timing configuration (SMTC) parameters.

In some implementations of method 900, the measurement configuration indicates a TRP index per measurement reference signal for each of the at least two different TRPs.

In some implementations of method 900, the reference signal corresponds to at least one of a synchronization signal block (SSB) or a channel state information reference signal (CSI-RS).

In some implementations of method 900, the UE 104 and/or the communication component 198/configuration component 240 configured for selecting at least the pair of RSs of the at least two different TRPs for the RACH procedure further comprises allocating at least two RACH occasions, each of the at least two RACH occasions corresponding to one of the at least two different TRPs.

In some implementations of method 900, the MSG1 is transmitted on each of the at least two RACH occasions to each TRP of the at least two different TRPs.

FIG. 10 is a flowchart 1000 of a method of wireless communication. The method may be performed by a network entity (e.g., the base station 102; the apparatus 310; the controller/processor 375, which may include the memory 376, processor(s) 1312, which may include the memory 1316, modem 1340 and which may be the entire base station 102 or a component of the base station 102, such as the TX processor 316, the RX processor 370, and/or the transceiver 1302) in combination with the communication component 199/configuration component 241.

At 1002, method 1000 includes transmitting a RACH configuration to a UE, the measurement configuration identifies at least two sets of RSs each corresponding to one of at least two different TRPs and at least two allocated RACH occasions. In an aspect, the base station 102 and/or the communication component 199/configuration component 241 may be configured to transmit a RACH configuration to a UE, the measurement configuration identifies at least two sets of RSs each corresponding to one of at least two different TRPs and at least two allocated RACH occasions. As such, the base station 102 and/or the communication component 199/configuration component 241, e.g., in conjunction with the controller/processor 375, which may include the memory 376, processor(s) 1312, which may include the memory 1316, modem 1340 and which may be the entire base station 102 or a component of the base station 102, such as the TX processor 316, the RX processor 370, and/or the transceiver 1302 may define a means for transmitting a RACH configuration to a UE, the measurement configuration identifies at least two sets of RSs each corresponding to one of at least two different TRPs and at least two allocated RACH occasions.

At 1004, method 1000 includes receiving a MSG1 of the RACH procedure from each of the at least two different TRPs with at least a pair of RSs of the at least two sets of RSs on one of the at least two allocated RACH occasions simultaneously using at least one of FDM and SDM. In an aspect, the base station 102 and/or the communication component 199/configuration component 241 may be configured to receive a MSG1 of the RACH procedure from each of the at least two different TRPs with at least a pair of RSs of the at least two sets of RSs on one of the at least two allocated RACH occasions simultaneously using at least one of FDM and SDM. As such, the base station 102 and/or the communication component 199/configuration component 241, e.g., in conjunction with the controller/processor 375, which may include the memory 376, processor(s) 1312, which may include the memory 1316, modem 1340 and which may be the entire base station 102 or a component of the base station 102, such as the TX processor 316, the RX processor 370, and/or the transceiver 1302 may define a means for receiving a MSG1 of the RACH procedure from each of the at least two different TRPs with at least a pair of RSs of the at least two sets of RSs on one of the at least two allocated RACH occasions simultaneously using at least one of FDM and SDM.

In some implementations of method 1000, the base station 102 and/or the communication component 199/configuration component 241 may be configured for receiving a beam report including one or more pairs of reference signals indices and corresponding TRP indices, wherein each of one or more pairs of beams corresponding to each of the one or more pairs of reference signals are simultaneously communicable.

In some implementations of method 1000, the base station 102 and/or the communication component 199/configuration component 241 may be configured for transmitting, to the at least two different TRPs associated with a secondary cell, an X2 message based on the beam report.

In some implementations of method 1000, the base station 102 and/or the communication component 199/configuration component 241 may be configured for transmitting, to the UE, a RRC reconfiguration with a set of reference signal pairs and TRP indices corresponding to each of the reference signal pairs.

In some implementations of method 1000, the RRC RACH configuration configures one or more measurement parameters with TRP indices for each of the at least two different TRPs.

In some implementations of method 1000, the one or more measurement parameters corresponds to one or more SMTC parameters.

In some implementations of method 1000, the measurement configuration indicates a TRP index per measurement reference signal for each of the at least two different TRPs.

In some implementations of method 1000, the base station 102 and/or the communication component 199/configuration component 241 may be configured for transmitting simultaneously from each of TRP of the at least two different TRPs a MSG2 via a PDCCH and a PDSCH of the RACH procedure to the UE using at least one of the FDM and the SDM.

In some implementations of method 1000, the base station 102 and/or the communication component 199/configuration component 241 may be configured for receiving simultaneously via each of TRP of the at least two different TRPs a MSG3 of the RACH procedure from the UE using at least one of the FDM and the SDM.

In some implementations of method 1000, the base station 102 and/or the communication component 199/configuration component 241 may be configured for transmitting simultaneously from each of TRP of the at least two different TRPs a MSG4 of the RACH procedure to the UE in response to transmitting the MSG3 using at least one of the FDM and the SDM.

In some implementations of method 1000, the MSG4 corresponds to a PDCCH and a PDSCH.

In some implementations of method 1000, the base station 102 and/or the communication component 199/configuration component 241 may be configured for receiving simultaneously via each of TRP of the at least two different TRPs a HARQ acknowledgement from the UE using at least one of the FDM and the SDM.

In some implementations of method 1000, the HARQ acknowledgement is received using a PUCCH.

Figure 11:
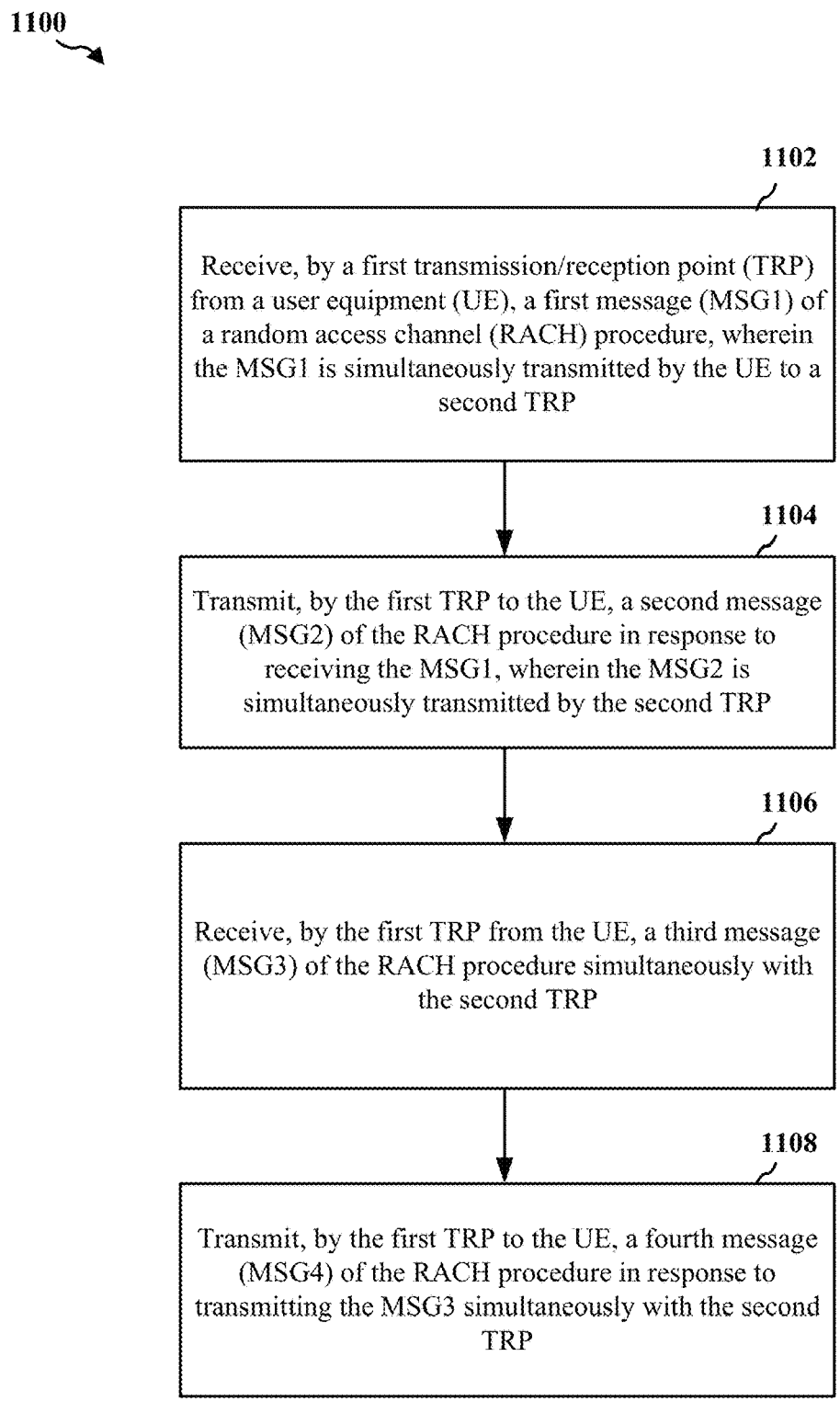
FIG. 11 is a flowchart of a method of wireless communication of an example of performing simultaneous message transmissions during a RACH procedure by a TRP, in accordance with various aspects of the present disclosure.

FIG. 11 is a flowchart 1100 of a method of wireless communication. The method may be performed by a network entity (e.g., the base station 102; the apparatus 310; the controller/processor 375, which may include the memory 376, processor(s) 1312, which may include the memory 1316, modem 1340 and which may be the entire base station 102 or a component of the base station 102, such as the TX processor 316, the RX processor 370, and/or the transceiver 1302) in combination with the communication component 199/configuration component 241.

At 1102, method 1100 includes receiving, by a first TRP from a UE, a MSG1 of a RACH procedure, wherein the MSG1 is simultaneously transmitted by the UE to a second TRP. In an aspect, the base station 102 and/or the communication component 199/configuration component 241 may be configured to receive, from a UE, a MSG1 of a RACH procedure, wherein the MSG1 is simultaneously transmitted by the UE to a second TRP. As such, the base station 102 and/or the communication component 199/configuration component 241, e.g., in conjunction with the controller/processor 375, which may include the memory 376, processor(s) 1312, which may include the memory 1316, modem 1340 and which may be the entire base station 102 or a component of the base station 102, such as the TX processor 316, the RX processor 370, and/or the transceiver 1302 may define a means for receiving, by a first TRP from a UE, a MSG1 of a RACH procedure, wherein the MSG1 is simultaneously transmitted by the UE to a second TRP.

At 1104, method 1100 includes transmitting, by the first TRP to the UE, a second message (MSG2) of the RACH procedure in response to receiving the MSG1, wherein the MSG2 is simultaneously transmitted by the second TRP. In an aspect, the base station 102 and/or the communication component 199/configuration component 241 may be configured to transmit to the UE, a MSG2 of the RACH procedure in response to receiving the MSG1, wherein the MSG2 is simultaneously transmitted by the second TRP. As such, the base station 102 and/or the communication component 199/configuration component 241, e.g., in conjunction with the controller/processor 375, which may include the memory 376, processor(s) 1312, which may include the memory 1316, modem 1340 and which may be the entire base station 102 or a component of the base station 102, such as the TX processor 316, the RX processor 370, and/or the transceiver 1302 may define a means for transmitting, by the first TRP to the UE, a MSG2 of the RACH procedure in response to receiving the MSG1, wherein the MSG2 is simultaneously transmitted by the second TRP.

At 1106, method 1100 includes receiving, by the first TRP from the UE, a third message (MSG3) of the RACH procedure simultaneously with the second TRP. In an aspect, the base station 102 and/or the communication component 199/configuration component 241 may be configured to receive, from the UE, a MSG3 of the RACH procedure simultaneously with the second TRP. As such, the base station 102 and/or the communication component 199/configuration component 241, e.g., in conjunction with the controller/processor 375, which may include the memory 376, processor(s) 1312, which may include the memory 1316, modem 1340 and which may be the entire base station 102 or a component of the base station 102, such as the TX processor 316, the RX processor 370, and/or the transceiver 1302 may define a means for receiving, by the first TRP from the UE, a MSG3 of the RACH procedure simultaneously with the second TRP.

At 1108, method 1100 includes transmitting, by the first TRP to the UE, a fourth message (MSG4) of the RACH procedure in response to transmitting the MSG3 simultaneously with the second TRP. In an aspect, the base station 102 and/or the communication component 199/configuration component 241 may be configured to transmit, to the UE, a MSG4 of the RACH procedure in response to transmitting the MSG3 simultaneously with the second TRP. As such, the base station 102 and/or the communication component 199/configuration component 241, e.g., in conjunction with the controller/processor 375, which may include the memory 376, processor(s) 1312, which may include the memory 1316, modem 1340 and which may be the entire base station 102 or a component of the base station 102, such as the TX processor 316, the RX processor 370, and/or the transceiver 1302 may define a means for transmitting, by the first TRP to the UE, a MSG4 of the RACH procedure in response to transmitting the MSG3 simultaneously with the second TRP.

Figure 12:
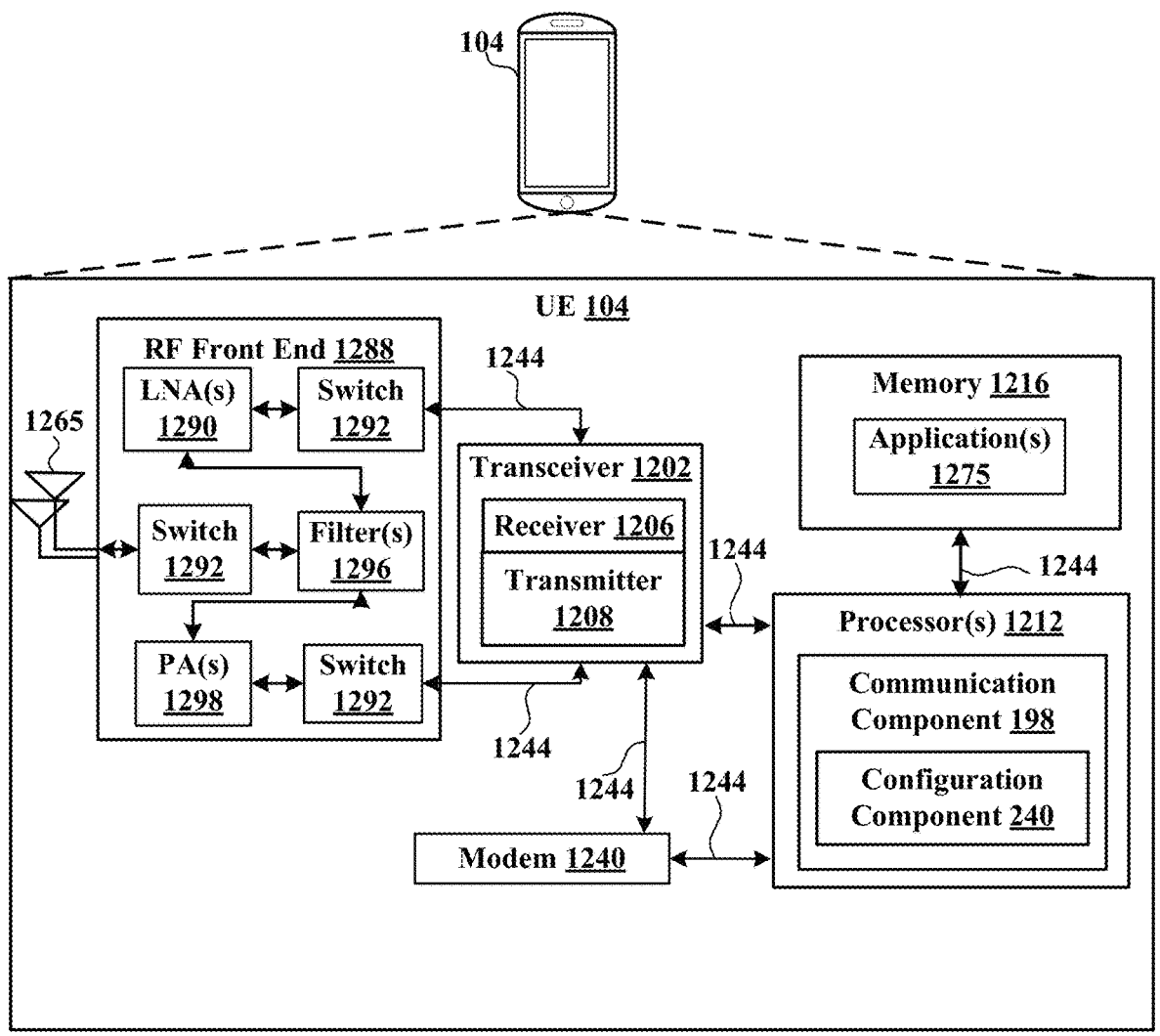
FIG. 12 is a block diagram illustrating an example of a UE, in accordance with various aspects of the present disclosure.

Referring to FIG. 12, one example of an implementation of UE 104 may include a variety of components, some of which have already been described above and are described further herein, including components such as one or more processors 1212 and memory 1216 and transceiver 1202 in communication via one or more buses 1244, which may operate in conjunction with modem 1240 and/or communication component 198 for simultaneous MSG transmissions in RACH procedure with multiple TRPs.

In an aspect, the one or more processors 1212 can include a modem 1240 and/or can be part of the modem 1240 that uses one or more modem processors. Thus, the various functions related to communication component 198 may be included in modem 1240 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 1240 associated with communication component 198 may be performed by transceiver 1202.

Also, memory 1216 may be configured to store data used herein and/or local versions of applications 1275 or communicating component 1242 and/or one or more of its subcomponents being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be anon-transitory computer-readable storage medium that stores one or more computer-executable codes defining communication component 198 and/or one or more of its subcomponents, and/or data associated therewith, when UE 104 is operating at least one processor 1212 to execute communication component 198 and/or one or more of its subcomponents.

Transceiver 1202 may include at least one receiver 1206 and at least one transmitter 1208. Receiver 1206 may include hardware and/or software executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 102. Additionally, receiver 1206 may process such received signals, and also may obtain measurements of the signals, such as, but not limited to, Ec/Io, signal-to-noise ratio (SNR), reference signal received power (RSRP), received signal strength indicator (RSSI), etc. Transmitter 1208 may include hardware and/or software executable by a processor for transmitting data, the code comprising instructions and being stored in a memory (e.g., computer-readable medium). A suitable example of transmitter 1208 may including, but is not limited to, an RF transmitter.

Moreover, in an aspect, UE 104 may include RF front end 1288, which may operate in communication with one or more antennas 1265 and transceiver 1202 for receiving and transmitting radio transmissions, for example, wireless communications transmitted by at least one base station 102 or wireless transmissions transmitted by UE 104. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 104 can communicate with, for example, one or more base stations 102 or one or more cells associated with one or more base stations 102. In an aspect, for example, modem 1240 can configure transceiver 1202 to operate at a specified frequency and power level based on the UE configuration of the UE 104 and the communication protocol used by modem 1240.

In an aspect, modem 1240 can be a multiband-multimode modem, which can process digital data and communicate with transceiver 1202 such that the digital data is sent and received using transceiver 1202. In an aspect, modem 1240 can be multiband and be configured to support multiple frequency bands for a specific communications protocol. In an aspect, modem 1240 can be multimode and be configured to support multiple operating networks and communications protocols. In an aspect, modem 1240 can control one or more components of UE 104 (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1212 may correspond to one or more of the processors described in connection with the UE in FIG. 3. Similarly, the memory 1216 may correspond to the memory described in connection with the UE in FIG. 3.

Figure 13:
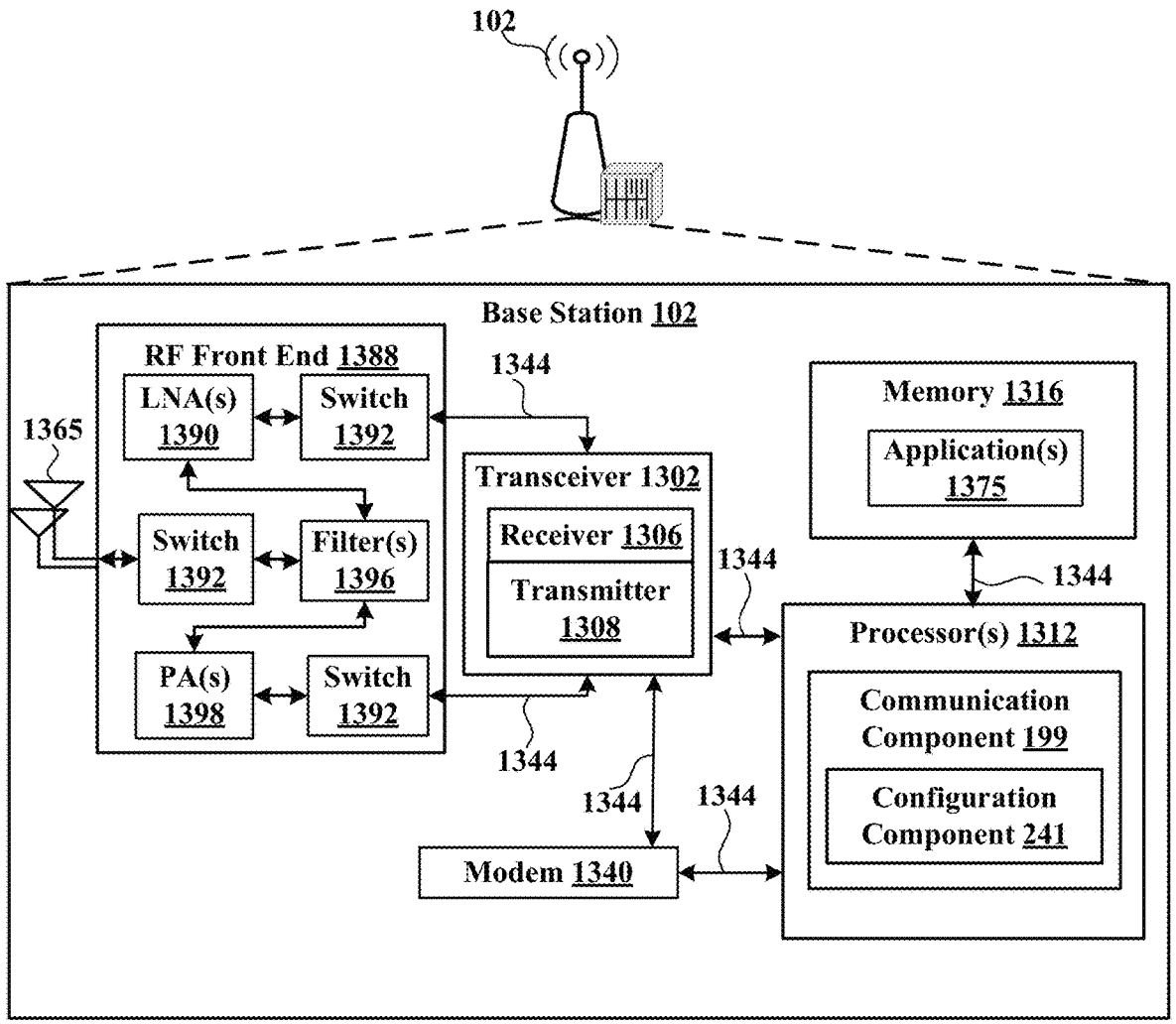
FIG. 13 is a block diagram illustrating an example of a base station, which may include a primary cell and/or a secondary cell, in accordance with various aspects of the present disclosure.

Referring to FIG. 13, one example of an implementation of base station 102 (e.g., a base station 102 or primary cell or secondary cell, as described above) may include a variety of components, some of which have already been described above, but including components such as one or more processors 1312 and memory 1316 and transceiver 1302 in communication via one or more buses 1344, which may operate in conjunction with modem 1340 and communication component 199 for communicating reference signals.

The transceiver 1302, receiver 1306, transmitter 1308, one or more processors 1312, memory 1316, applications 1375, buses 1344, RF front end 1388, LNAs 1390, switches 1392, filters 1396, PAs 1398, and one or more antennas 1365 may be the same as or similar to the corresponding components of UE 104, as described above, but configured or otherwise programmed for base station operations as opposed to UE operations.

In an aspect, the processor(s) 1312 may correspond to one or more of the processors described in connection with the base station in FIG. 3. Similarly, the memory 1316 may correspond to the memory described in connection with the base station in FIG. 3.

SOME FURTHER EXAMPLE CLAUSES

Implementation examples are described in the following numbered clauses:

1. An apparatus for wireless communication at a user equipment (UE), comprising:
   a transceiver;
   a memory configured to store instructions; and
   one or more processors communicatively coupled with the transceiver and the memory, wherein the one or more processors are configured to:
   receive a random access channel (RACH) configuration from a network entity of a primary cell, the RACH configuration identifies at least two sets of reference signals (RSs) each corresponding to one of at least two different transmission/reception points (TRPs) of a secondary cell;
   measure one or more transmissions on each of the at least two sets of RSs for the at least two different TRPs;
   select at least a pair of RSs from the at least two different TRPs for a RACH procedure based on measuring the one or more transmissions; and
   transmit a first message (MSG1) of the RACH procedure with at least the pair of RSs on at least two allocated RACH occasions simultaneously to each TRP of the at least two different TRPs using at least one of frequency division multiplexing (FDM) and spatial division multiplexing (SDM).
2. The apparatus of clause 1, wherein the one or more processors are configured to receive a second message (MSG2) of a physical downlink control channel (PDCCH) and a Physical Downlink Shared Channel (PDSCH) of the RACH procedure simultaneously from each TRP of the at least two different TRPs using at least one of the FDM and the SDM.
3. The apparatus of clause 2, wherein the MSG2 is received via a same or different PDCCH beam from the each TRP of the at least two different of TRPs.
4. The apparatus of clause 2, wherein the one or more processors are configured to transmit a third message (MSG3) of the RACH procedure simultaneously to each TRP of the at least two different TRPs using at least one of the FDM and the SDM.
5. The apparatus of clause 4, wherein the one or more processors are configured to receive a fourth message (MSG4) of the RACH procedure simultaneously from each TRP of the at least two different TRPs in response to transmitting the MSG3 using at least one of the FDM and the SDM.
6. The apparatus of clause 5, wherein the MSG4 corresponds to a PDCCH part and a physical downlink shared channel (PDSCH) part.
7. The apparatus of clause 5, wherein the one or more processors are configured to transmit a hybrid automatic request (HARQ) acknowledgement simultaneously to each of TRP of the at least two different TRPs using at least one of the FDM and the SDM.
8. The apparatus of clause 7, wherein the HARQ acknowledgement is transmitted using a physical uplink control channel (PUCCH).
9. The apparatus of clause 1, wherein the one or more processors are configured to receive a radio resource control (RRC) reconfiguration measurement configuration from the network entity of the primary cell prior to performing the RACH procedure.
10. The apparatus of clause 9, wherein the RRC reconfiguration measurement configuration configures one or more measurement parameters with TRP indices for each of the at least two different TRPs.
11. The apparatus of clause 10, wherein the one or more measurement parameters corresponds to one or more synchronization signal block (SSB)-based measurement timing configuration (SMTC) parameters.
12. The apparatus of clause 1, wherein the measurement configuration indicates a TRP index per measurement reference signal for each of the at least two different TRPs.
13. The apparatus of clause 12, wherein the reference signal corresponds to at least one of a synchronization signal block (SSB) or a channel state information reference signal (CSI-RS).
14. The apparatus of clause 1, wherein the one or more processors configured to select at least the pair of RSs of the at least two different TRPs for the RACH procedure are further configured to allocate at least two RACH occasions, each of the at least two RACH occasions corresponding to one of the at least two different TRPs.

15. The apparatus of clause 14, wherein the MSG1 is transmitted on each of the at least two RACH occasions to each TRP of the at least two different TRPs.

16. A method of wireless communication at a network entity, comprising: transmitting a random access channel (RACH) configuration to a user equipment (UE), the RACH configuration identifies at least two sets of reference signals (RSs) each corresponding to one of at least two different transmission/reception points (TRPs) and at least two allocated RACH occasions; and receiving a first message (MSG1) of a RACH procedure from each of the at least two different TRPs with at least a pair of RSs of the at least two sets of RSs on one of the at least two allocated RACH occasions simultaneously using at least one of frequency division multiplexing (FDM) and spatial division multiplexing (SDM).

17. The apparatus of clause 16, wherein the one or more processors are configured to receive a beam report including one or more pairs of reference signals indices and corresponding TRP indices, wherein each of one or more pairs of beams corresponding to each of the one or more pairs of reference signals are simultaneously communicable.

18. The apparatus of clause 17, wherein the one or more processors are configured to transmit, to the at least two different TRPs associated with a secondary cell, an X2 message based on the beam report.

19. The apparatus of clause 16, wherein the one or more processors are configured to transmit, to the UE, a radio resource configuration (RRC) reconfiguration with a set of reference signal pairs and TRP indices corresponding to each of the reference signal pairs.

20. The apparatus of clause 19, wherein the RRC reconfiguration configures one or more measurement parameters with TRP indices for each of the at least two different TRPs.

21. The apparatus of clause 20, wherein the one or more measurement parameters corresponds to one or more synchronization signal block (SSB)-based measurement timing configuration (SMTC) parameters.

22. The apparatus of clause 16, wherein the measurement configuration indicates a TRP index per measurement reference signal for each of the at least two different TRPs.

23. The apparatus of clause 16, wherein the one or more processors are configured to transmit simultaneously from each of TRP of the at least two different TRPs a second message (MSG2) via a physical downlink control channel (PDCCH) and a Physical Downlink Shared Channel (PDSCH) of the RACH procedure to the UE using at least one of the FDM and the SDM.

24. The apparatus of clause 23, wherein the one or more processors are configured to receive simultaneously via each of TRP of the at least two different TRPs a third message (MSG3) of the RACH procedure from the UE using at least one of the FDM and the SDM.

25. The apparatus of clause 24, wherein the one or more processors are configured to transmit simultaneously from each of TRP of the at least two different TRPs a fourth message (MSG4) of the RACH procedure to the UE in response to transmitting the MSG3 using at least one of the FDM and the SDM.

26. The apparatus of clause 25, wherein the MSG4 corresponds to a physical downlink control channel (PDCCH) and a physical downlink shared channel (PDSCH).

27. The apparatus of clause 25, wherein the one or more processors are configured to receive simultaneously via each of TRP of the at least two different TRPs a hybrid automatic request (HARQ) acknowledgement from the UE using at least one of the FDM and the SDM.

28. The apparatus of clause 27, wherein the HARQ acknowledgement is received using a physical uplink control channel (PUCCH).

29. A method of wireless communications at a user equipment (UE), comprising:
receiving a random access channel (RACH) configuration from a network entity of a primary cell, the RACH configuration identifies at least two sets of reference signals (RSs) each corresponding to one of at least two different transmission/reception points (TRPs) of a secondary cell;
measuring one or more transmissions on each of the at least two sets of RSs for the at least two different TRPs;
selecting at least a pair of RSs from the at least two different TRPs for a RACH procedure based on measuring the one or more transmissions; and
transmitting a first message (MSG1) of the RACH procedure with at least the pair of RSs on at least two allocated RACH occasions simultaneously to each TRP of the at least two different TRPs using at least one of frequency division multiplexing (FDM) and spatial division multiplexing (SDM).

30. A method of wireless communications at a network entity, comprising:
transmitting a random access channel (RACH) configuration to a user equipment (UE), the RACH configuration identifies at least two sets of reference signals (RSs) each corresponding to one of at least two different transmission/reception points (TRPs) and at least two allocated RACH occasions; and
receiving a first message (MSG1) of a RACH procedure from each of the at least two different TRPs with at least a pair of RSs of the at least two sets of RSs on one of the at least two allocated RACH occasions simultaneously using at least one of frequency division multiplexing (FDM) and spatial division multiplexing (SDM).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
    a transceiver;
    a memory configured to store instructions; and
    one or more processors communicatively coupled with the transceiver and the memory, wherein the one or more processors are configured to:
        receive a random access channel (RACH) configuration from a network entity of a primary cell, the RACH configuration identifies at least two sets of reference signals (RSs) each corresponding to one of at least two different transmission/reception points (TRPs) of a secondary cell;
        measure one or more transmissions on each of the at least two sets of RSs for the at least two different TRPs;
        select at least a pair of RSs from the at least two different TRPs for a RACH procedure based on measuring the one or more transmissions; and
        transmit a first message (MSG1) of the RACH procedure with at least the pair of RSs on at least two allocated RACH occasions simultaneously to each TRP of the at least two different TRPs using at least one of frequency division multiplexing (FDM) and spatial division multiplexing (SDM).

2. The apparatus of claim 1, wherein the one or more processors are configured to receive a second message (MSG2) of a physical downlink control channel (PDCCH) and a Physical Downlink Shared Channel (PDSCH) of the RACH procedure simultaneously from each TRP of the at least two different TRPs using at least one of the FDM and the SDM.

3. The apparatus of claim 2, wherein the MSG2 is received via a same or different PDCCH beam from the each TRP of the at least two different of TRPs.

4. The apparatus of claim 2, wherein the one or more processors are configured to transmit a third message (MSG3) of the RACH procedure simultaneously to each TRP of the at least two different TRPs using at least one of the FDM and the SDM.

5. The apparatus of claim 4, wherein the one or more processors are configured to receive a fourth message (MSG4) of the RACH procedure simultaneously from each TRP of the at least two different TRPs in response to transmitting the MSG3 using at least one of the FDM and the SDM.

6. The apparatus of claim 5, wherein the MSG4 corresponds to a PDCCH part and a physical downlink shared channel (PDSCH) part.

7. The apparatus of claim 5, wherein the one or more processors are configured to transmit a hybrid automatic request (HARQ) acknowledgement simultaneously to each of TRP of the at least two different TRPs using at least one of the FDM and the SDM.

8. The apparatus of claim 7, wherein the HARQ acknowledgement is transmitted using a physical uplink control channel (PUCCH).

9. The apparatus of claim 1, wherein the one or more processors are configured to receive a radio resource control (RRC) reconfiguration measurement configuration from the network entity of the primary cell prior to performing the RACH procedure.

10. The apparatus of claim 9, wherein the RRC reconfiguration measurement configuration configures one or more measurement parameters with TRP indices for each of the at least two different TRPs.

11. The apparatus of claim 10, wherein the one or more measurement parameters corresponds to one or more synchronization signal block (SSB)-based measurement timing configuration (SMTC) parameters.

12. The apparatus of claim 1, wherein the measurement configuration indicates a TRP index per measurement reference signal for each of the at least two different TRPs.

13. The apparatus of claim 12, wherein the reference signal corresponds to at least one of a synchronization signal block (SSB) or a channel state information reference signal (CSI-RS).

14. The apparatus of claim 1, wherein the one or more processors configured to select at least the pair of RSs of the at least two different TRPs for the RACH procedure are further configured to allocate at least two RACH occasions, each of the at least two RACH occasions corresponding to one of the at least two different TRPs.

15. The method of claim 14, wherein the MSG1 is transmitted on each of the at least two RACH occasions to each TRP of the at least two different TRPs.

16. An apparatus for wireless communication at a network entity, comprising:
    a transceiver;
    a memory configured to store instructions; and
    one or more processors communicatively coupled with the transceiver and the memory, wherein the one or more processors are configured to:
        transmit a random access channel (RACH) configuration to a user equipment (UE), the RACH configuration identifies at least two sets of reference signals (RSs) each corresponding to one of at least two different transmission/reception points (TRPs) and at least two allocated RACH occasions; and
        receive a first message (MSG1) of a RACH procedure from each of the at least two different TRPs with at least a pair of RSs of the at least two sets of RSs on one of the at least two allocated RACH occasions simultaneously using at least one of frequency division multiplexing (FDM) and spatial division multiplexing (SDM).

17. The apparatus of claim 16, wherein the one or more processors are configured to receive a beam report including one or more pairs of reference signals indices and corresponding TRP indices, wherein each of one or more pairs of beams corresponding to each of the one or more pairs of reference signals are simultaneously communicable.

18. The apparatus of claim 17, wherein the one or more processors are configured to transmit, to the at least two different TRPs associated with a secondary cell, an X2 message based on the beam report.

19. The apparatus of claim 16, wherein the one or more processors are configured to transmit, to the UE, a radio resource configuration (RRC) reconfiguration with a set of reference signal pairs and TRP indices corresponding to each of the reference signal pairs.

20. The apparatus of claim 19, wherein the RRC reconfiguration configures one or more measurement parameters with TRP indices for each of the at least two different TRPs.

21. The apparatus of claim 20, wherein the one or more measurement parameters corresponds to one or more synchronization signal block (SSB)-based measurement timing configuration (SMTC) parameters.

22. The apparatus of claim 16, wherein the measurement configuration indicates a TRP index per measurement reference signal for each of the at least two different TRPs.

23. The apparatus of claim 16, wherein the one or more processors are configured to transmit simultaneously from each of TRP of the at least two different TRPs a second message (MSG2) via a physical downlink control channel (PDCCH) and a Physical Downlink Shared Channel (PDSCH) of the RACH procedure to the UE using at least one of the FDM and the SDM.

24. The apparatus of claim 23, wherein the one or more processors are configured to receive simultaneously via each of TRP of the at least two different TRPs a third message (MSG3) of the RACH procedure from the UE using at least one of the FDM and the SDM.

25. The apparatus of claim 24, wherein the one or more processors are configured to transmit simultaneously from each of TRP of the at least two different TRPs a fourth message (MSG4) of the RACH procedure to the UE in response to transmitting the MSG3 using at least one of the FDM and the SDM.

26. The apparatus of claim 25, wherein the MSG4 corresponds to a physical downlink control channel (PDCCH) and a physical downlink shared channel (PDSCH).

27. The apparatus of claim 25, wherein the one or more processors are configured to receive simultaneously via each of TRP of the at least two different TRPs a hybrid automatic request (HARQ) acknowledgement from the UE using at least one of the FDM and the SDM.

28. The apparatus of claim 27, wherein the HARQ acknowledgement is received using a physical uplink control channel (PUCCH).

29. A method of wireless communications at a user equipment (UE), comprising:

receiving a random access channel (RACH) configuration from a network entity of a primary cell, the RACH configuration identifies at least two sets of reference signals (RSs) each corresponding to one of at least two different transmission/reception points (TRPs) of a secondary cell;

measuring one or more transmissions on each of the at least two sets of RSs for the at least two different TRPs;

selecting at least a pair of RSs from the at least two different TRPs for a RACH procedure based on measuring the one or more transmissions; and transmitting a first message (MSG1) of the RACH procedure with at least the pair of RSs on at least two allocated RACH occasions simultaneously to each TRP of the at least two different TRPs using at least one of frequency division multiplexing (FDM) and spatial division multiplexing (SDM).

30. A method of wireless communication at a network entity, comprising:

transmitting a random access channel (RACH) configuration to a user equipment (UE), the RACH configuration identifies at least two sets of reference signals (RSs) each corresponding to one of at least two different transmission/reception points (TRPs) and at least two allocated RACH occasions; and receiving a first message (MSG1) of a RACH procedure from each of the at least two different TRPs with at least a pair of RSs of the at least two sets of RSs on one of the at least two allocated RACH occasions simultaneously using at least one of frequency division multiplexing (FDM) and spatial division multiplexing (SDM).

* * * * *